US011052284B2

(12) United States Patent
Suk et al.

(10) Patent No.: US 11,052,284 B2
(45) Date of Patent: Jul. 6, 2021

(54) METHOD, SYSTEM AND NON-TRANSITORY COMPUTER-READABLE RECORDING MEDIUM FOR SUPPORTING SHOOTING A GOLF SWING

(71) Applicant: CREATZ., INC., Suwon-si (KR)

(72) Inventors: Yong Ho Suk, Gyeonggi-do (KR); Jey Ho Suk, Seoul (KR)

(73) Assignee: CREATZ., INC., Suwon-si (KR)

( * ) Notice: Subject to any disclaimer, the term of this patent is extended or adjusted under 35 U.S.C. 154(b) by 0 days.

(21) Appl. No.: 16/666,743

(22) Filed: Oct. 29, 2019

(65) Prior Publication Data
US 2020/0129809 A1 Apr. 30, 2020

(30) Foreign Application Priority Data

Oct. 29, 2018 (KR) .................. 10-2018-0130233

(51) Int. Cl.
*A63B 69/36* (2006.01)
*A63B 24/00* (2006.01)

(52) U.S. Cl.
CPC ...... *A63B 24/0006* (2013.01); *A63B 69/3623* (2013.01); *A63B 2024/0009* (2013.01); *A63B 2024/0015* (2013.01); *A63B 2220/807* (2013.01); *A63B 2225/50* (2013.01)

(58) Field of Classification Search
CPC .............. A63B 24/0021; A63B 43/008; A63B 37/0022; A63B 71/0622; A63B 2024/0034; A63B 2071/0638; A63B 2071/0694; A63B 2220/05; A63B 2220/35; A63B 2220/807
See application file for complete search history.

(56) References Cited

U.S. PATENT DOCUMENTS

| 5,471,383 A | * | 11/1995 | Gobush | .............. | A63B 69/0026 |
| | | | | | 700/91 |
| 6,458,035 B1 | * | 10/2002 | Katayama | .......... | A63B 24/0021 |
| | | | | | 473/152 |
| 7,086,954 B2 | * | 8/2006 | Gobush | ..................... | G01P 3/40 |
| | | | | | 473/198 |
| 2013/0316839 A1 | * | 11/2013 | Woo | ........................ | A63F 13/06 |
| | | | | | 473/156 |
| 2014/0003666 A1 | * | 1/2014 | Park | ..................... | G06K 9/3241 |
| | | | | | 382/103 |
| 2014/0004969 A1 | * | 1/2014 | Jang | ................... | G09B 19/0038 |
| | | | | | 473/156 |
| 2015/0350609 A1 | * | 12/2015 | Kim | ........................ | G06T 7/246 |
| | | | | | 348/47 |
| 2015/0381886 A1 | * | 12/2015 | Kato | .................. | H04N 5/23245 |
| | | | | | 348/207.1 |

(Continued)

*Primary Examiner* — Lawrence S Galka

(74) *Attorney, Agent, or Firm* — Dinsmore & Shohl LLP; Yongsok Choi, Esq.

(57) ABSTRACT

The present invention relates to a method, system, and non-transitory computer-readable recording medium for supporting photographing of a golf swing. According to one aspect of the invention, there is provided a method for supporting photographing of a golf swing, the method comprising the steps of: (i) determining a user device matched with information on a user who is to perform a golf swing, among a plurality of user devices, with reference to a scenario associated with the golf swing; and (ii) causing a photographing module of the determined user device to photograph the golf swing of the user.

11 Claims, 3 Drawing Sheets

(56) References Cited

U.S. PATENT DOCUMENTS

| | | | |
|---|---|---|---|
| 2017/0200277 A1* | 7/2017 | Keat | G06T 7/248 |
| 2017/0254892 A1* | 9/2017 | Tuxen | G01S 13/58 |
| 2018/0005396 A1* | 1/2018 | Suk | G06T 7/246 |
| 2018/0221746 A1* | 8/2018 | Joo | A63B 69/3658 |

* cited by examiner

METHOD, SYSTEM AND NON-TRANSITORY COMPUTER-READABLE RECORDING MEDIUM FOR SUPPORTING SHOOTING A GOLF SWING

CROSS-REFERENCE TO RELATED APPLICATION(S)

This application claims priority to Korean Patent Application No. 10-2018-0130233 filed on Oct. 29, 2018, the entire contents of which are hereby incorporated by reference.

FIELD OF THE INVENTION

The present invention relates to a method, system, and non-transitory computer-readable recording medium for supporting photographing of a golf swing.

BACKGROUND

Improved living standards and increased leisure time have made golf popular, and a growing number of newcomers begin to play golf as part of their use of leisure. In general, golf is a sport aimed at hitting a ball placed on a tee or floor in a field with a golf club (having a grip, shaft, and head) and putting it into a hole within a predetermined number of times. Because of the popularity of golf, indoor driving ranges are increasing where a golfer can perform a golf swing without personally going out to the field.

Such a golf swing aims to move the head of the golf club in a specific trajectory to precisely send the golf ball flying at a desired distance in a desired direction. In performing a correct golf swing, a series of postures for the swing (i.e., address—back swing—impact—finish) are very important. For golfers, the goal of golf practice is to repeat the above series of posture elements and find the ideal postures that suit them so that they can always reproduce the same postures. In this regard, indoor driving ranges, golf simulation driving ranges, and the like are provided with cameras for photographing the swings of users to support the achievement of the above goal.

As an example of related conventional techniques, a golf swing action analysis system has been introduced, which comprises: a first photographing module that is attached adjacent to a club head to take a moving shot of a golfer's swing; a second photographing module that is installed adjacent to a swing zone to take a full shot of the golfer's swing; a communication module for receiving images photographed by the first and second photographing modules; an analysis module for analyzing the moving shot and full shot of the swing received by the communication module; an output module for outputting information analyzed by the analysis module; and a storage module for storing the information analyzed by the analysis module.

However, the existing indoor driving ranges or golf simulation driving ranges are commonly provided with cameras such as web cams or CCTV cameras for economic reasons, and the poor image quality of the cameras makes it difficult to examine and analyze a golfer's swing posture in detail.

In this connection, the inventor(s) take notice of the popularization of smart devices such as smartphones having high-performance photographing modules, and present a technique for allowing each of a plurality of smart devices to interwork with an existing golf simulation system or the like and photograph a golf swing of a corresponding golfer.

SUMMARY OF THE INVENTION

One object of the present invention is to solve all the above-described problems in the prior art.

Another object of the invention is to provide high-quality golf swing images for golfers without installing an expensive photographing module in a conventional golf simulation system.

Yet another object of the invention is to adequately protect privacy of golfers by allowing the golfers to take photographs of their golf swings using their own smart devices and store the photographs directly on their smart devices.

The representative configurations of the invention to achieve the above objects are described below.

According to one aspect of the invention, there is provided a method for supporting photographing of a golf swing, the method comprising the steps of: (i) determining a user device matched with information on a user who is to perform a golf swing, among a plurality of user devices, with reference to a scenario associated with the golf swing; and (ii) causing a photographing module of the determined user device to photograph the golf swing of the user.

According to another aspect of the invention, there is provided a system for supporting photographing of a golf swing, the system comprising: a target device determination unit configured to determine a user device matched with information on a user who is to perform a golf swing, among a plurality of user devices, with reference to a scenario associated with the golf swing; and a photographing management unit configured to cause a photographing module of the determined user device to photograph the golf swing of the user.

In addition, there are further provided other methods and systems to implement the invention, as well as non-transitory computer-readable recording media having stored thereon computer programs for executing the methods.

According to the invention, it is possible to provide high-quality golf swing images for golfers without installing an expensive photographing module in a conventional golf simulation system.

According to the invention, it is possible to adequately protect privacy of golfers by allowing the golfers to take photographs of their golf swings using their own smart devices and store the photographs directly on their smart devices.

DETAILED DESCRIPTION

Figure 1:
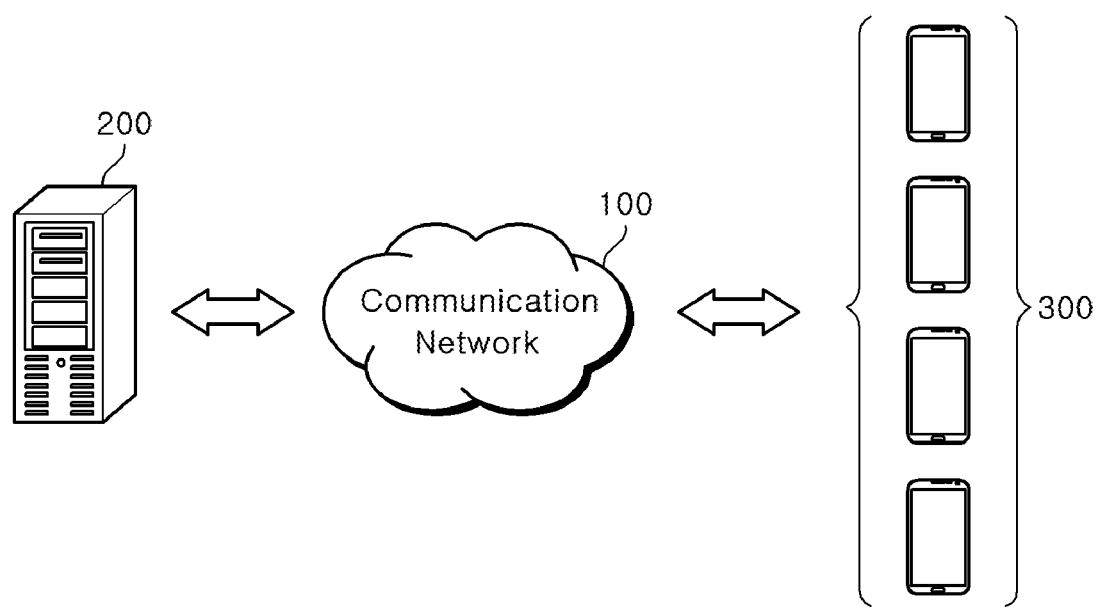
FIG. 1 schematically shows the configuration of an entire system for supporting photographing of a golf swing according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for supporting photographing of a golf swing according to one embodiment of the invention.

As shown in FIG. 1, the entire system according to one embodiment of the invention may comprise a communication network 100, a support system 200, and a plurality of user devices 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the support system 200 according to one embodiment of the invention may be a digital device having a memory means and a microprocessor for computing capabilities. The support system 200 may be a server system. Meanwhile, according to one embodiment of the invention, the support system 200 may be included in a conventional golf simulation system (not shown).

The support system 200 according to one embodiment of the invention may function to determine a user device 300 matched with information on a user who is to perform a golf swing, among the plurality of user devices 300 to be described below, with reference to a scenario associated with the golf swing, and to use a photographing module of the determined user device 300 to photograph the golf swing of the user.

The photographing module according to one embodiment of the invention may be a camera included in the user device 300, and the camera may include a two-dimensional or three-dimensional camera, an infrared or ultraviolet camera, and the like. Alternatively, the camera may be an external camera that is not included in but controlled by the user device 300.

The configuration and functions of the support system 200 according to the invention will be discussed in more detail below. Meanwhile, although the support system 200 has been described as above, the above description is illustrative, and it will be apparent to those skilled in the art that at least a part of the functions or components required for the support system 200 may be implemented or included in an external system (not shown), as necessary.

Next, the user device 300 according to one embodiment of the invention is digital equipment that may function to connect to and then communicate with the support system 200 via the communication network 100, and any type of portable digital equipment having a memory means and a microprocessor for computing capabilities, such as a smart phone and a tablet PC, may be adopted as the user device 300 according to the invention.

Meanwhile, according to one embodiment of the invention, the user device 300 may include an application for supporting photographing of a golf swing. The application may be downloaded from the support system 200 or an external application distribution server (not shown). The functions of the application will be further described below.

Configuration of the Support System

Hereinafter, the internal configuration of the support system 200 crucial for implementing the invention and the functions of the respective components thereof will be discussed.

Figure 2:
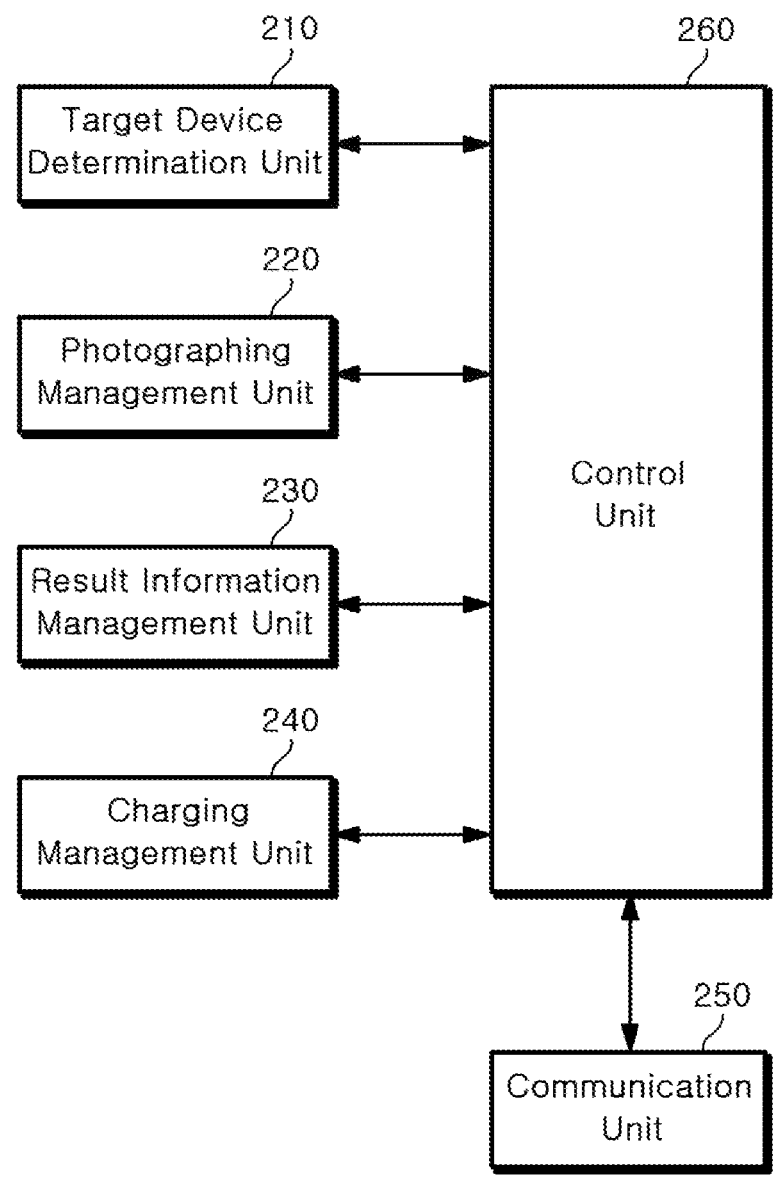
FIG. 2 specifically shows the internal configuration of a support system according to one embodiment of the invention.

FIG. 2 specifically shows the internal configuration of the support system 200 according to one embodiment of the invention.

As shown in FIG. 2, the support system 200 according to one embodiment of the invention may comprise a target device determination unit 210, a photographing management unit 220, a result information management unit 230, a charging management unit 240, a communication unit 250, and a control unit 260. According to one embodiment of the invention, at least some of the target device determination unit 210, the photographing management unit 220, the result information management unit 230, the charging management unit 240, the communication unit 250, and the control unit 260 may be program modules that communicate with the user devices 300 or an external system. The program modules may be included in the support system 200 in the form of operating systems, application program modules, and other program modules, while they may be physically stored in a variety of commonly known storage devices. Further, the program modules may also be stored in a remote storage device that may communicate with the support system 200. Meanwhile, such program modules may include, but are not limited to, routines, subroutines, programs, objects, components, and data structures for performing specific tasks or executing specific abstract data types according to the invention as will be described below.

First, the target device determination unit 210 according to one embodiment of the invention may function to determine a user device 300 matched with information on a user who is to shortly perform a golf swing, among the plurality of user devices 300, with reference to a scenario associated with the golf swing. According to one embodiment of the invention, the scenario associated with the golf swing may include a scenario for the order of golf shot turns (e.g., tee shot turns) in an actual match or practice (or in a golf simulation). Further, according to one embodiment of the invention, the information on the user may include turn information of the user or identification information (e.g., a facial image, name, ID, birth date, phone number, device IMEI, etc.) of the user.

For example, the target device determination unit 210 may be simultaneously or sequentially connected with each of the plurality of user device 300 via the communication network 100, and may determine, as the matched user device 300, a user device 300 corresponding to a user who takes a turn determined on the basis of the scenario associated with the golf swing, among the connected user devices 300. More specifically, when the scenario associated with the golf swing is intended for an individual match between first to third users and determined such that the golf swing is to be performed in the order of the first to third users, the target device determination unit 210 may determine, as the matched user device 300, a user device 300 corresponding to the second user who takes a turn to perform the golf swing according to the scenario, after the first user has performed the golf swing.

The scenario associated with the golf swing may be inputted in advance by an application included in at least one of the plurality of user devices 300, or may be determined according to simulation progress of a conventional golf simulation system.

Next, the photographing management unit 220 according to one embodiment of the invention may cause a photographing module of the user device 300 determined by the target device determination unit 210 to photograph the golf swing of the user.

Specifically, when the user device 300 to perform the photographing is determined, information on a start time and an end time for the photographing of the user's golf swing may be determined, and the determined user device 300 may control the photographing module to start and end the photographing on the basis of the determined information.

For example, the photographing management unit 220 may determine the start time and end time of the photographing on the basis of information on at least one of a position and a posture of the user.

More specifically, the photographing management unit 220 may start the photographing when the user is located in a golf swing zone or takes a preparatory action of the golf swing, and may end the photographing when the user is out of the golf swing zone or takes a finish action of the golf swing.

To this end, the photographing management unit 220 may include a known image analysis means. The known image analysis means may compare an image of the user being in the golf swing zone or performing a golf swing action with a predetermined profile.

As another example, the photographing management unit 220 may determine the start time and end time of the photographing on the basis of information on a position of a golf ball for which the golf swing is to be performed.

More specifically, the photographing management unit 220 may start the photographing when the golf ball is located in a golf swing zone or on a tee, and may end the photographing when the golf ball is out of the golf swing zone or the tee.

Next, the result information management unit 230 according to one embodiment of the invention may function to appropriately manage information on a result of the scenario associated with the golf swing (i.e., a result of each user's golf swing) and provide needed information to the user devices 300.

For example, the result information management unit 230 may allow an image in which each user's golf swing is photographed to be stored only in the user device 300 of the corresponding user (i.e., such that even if the image is temporarily provided to the support system 200 for display of a match or the like, it is completely deleted after the display), and may allow an organized collection of images (or a video) in which each user's golf swing is consecutively photographed to be provided to the user device 300 of the corresponding user.

Next, the charging management unit 240 according to one embodiment of the invention may function to perform wired or wireless charging for at least some of the plurality of user devices 300.

For example, the charging management unit 240 may be connected with the user devices 300 by means of cables and charging terminals included therein to perform wired charging for the user devices 300, or may perform wireless charging for the user devices 300 by means of at least one of an inductive coupling method based on magnetic induction and a resonant coupling method based on electromagnetic resonance.

Next, the communication unit 250 according to one embodiment of the invention may function to enable data transmission/reception from/to the target device determination unit 210, the photographing management unit 220, the result information management unit 230, and the charging management unit 240.

Lastly, the control unit 260 according to one embodiment of the invention may function to control data flow among the target device determination unit 210, the photographing management unit 220, the result information management unit 230, the charging management unit 240, and the communication unit 250. That is, the control unit 260 may control data flow into/out of the support system 200 or data flow among the respective components of the support system 200, such that the target device determination unit 210, the photographing management unit 220, the result information management unit 230, the charging management unit 240, and the communication unit 250 may carry out their particular functions, respectively.

Figure 3:
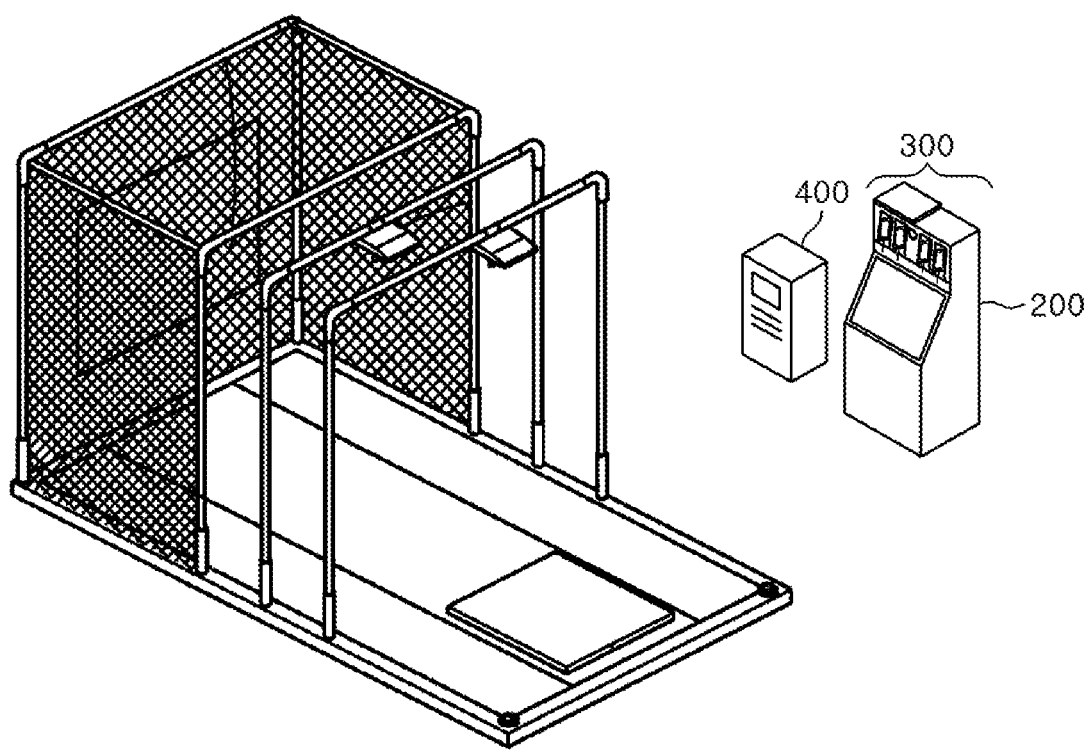
FIG. 3 illustratively shows a situation in which photographing is supported by the support system according to one embodiment of the invention.

FIG. 3 illustratively shows a situation in which photographing is supported by the support system 200 according to one embodiment of the invention.

As shown in FIG. 3, it may be assumed that the support system 200 according to one embodiment of the invention is configured in the form of a kiosk, and connected with a conventional golf simulation system 400 via the communication network 100.

First, when each of a plurality of users places his/her user device 300 on the kiosk 200, each of the user devices 300 may be connected with the kiosk 200 via the communication network 100 and subjected to wired or wireless charging.

Next, a user device 300 matched with information on a user who is to shortly perform a golf swing may be determined among the plurality of user devices 300 connected with the kiosk 200, on the basis of a scenario associated with the golf swing.

Next, a photographing module of the determined user device 300 may photograph the golf swing of the corresponding user. In this case, a start time and an end time of the photographing may be determined on the basis of information on at least one of a position and a posture of the user, or information on a position of a golf ball for which the golf swing is to be performed.

Next, the determined user device 300 may be provided with information on a result of the scenario associated with the golf swing, i.e., an organized collection of images (or a video) of the user's golf swing.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for supporting photographing of a golf swing, the system comprising a target device determination unit, a photographing management unit, and a result information management unit, and the method comprising the steps of:
   (i) by the target device determination unit, determining a user device matched with information on a user who is to perform a golf swing, among a plurality of user devices, with reference to a scenario associated with the golf swing;
   (ii) by the photographing management unit, causing a photographing module of the determined user device to photograph the golf swing of the user; and
   (iii) by the result information management unit, providing information on a result of the scenario associated with the golf swing to the determined user device,
   wherein the step (i) comprises the step of determining, as the matched user device, a user device corresponding to a user who takes a turn determined on the basis of the scenario associated with the golf swing, among the plurality of user devices.

2. The method of claim 1, wherein the step (ii) comprises the step of determining a start time and an end time of the photographing on the basis of information on at least one of a position and a posture of the user.

3. The method of claim 1, wherein the step (ii) comprises the step of determining a start time and an end time of the photographing on the basis of information on a position of a golf ball for which the golf swing is to be performed.

4. The method of claim 1, wherein the step (i) comprises the step of determining, as the matched user device, the user device corresponding to the user who takes a turn determined on the basis of a shot order of a plurality of users included the scenario associated with the golf swing, among the plurality of user devices.

5. The method of claim 1, wherein the plurality of user devices correspond to different users, respectively.

6. The method of claim 1, wherein the method further comprises the step of:
   (iv) by the result information management unit, allowing the information on the result of the scenario associated with the golf swing to be stored only in the determined user device.

7. The method of claim 1, wherein the method further comprises the step of:
   iv) by the result information management unit, deleting the photographed golf swing of the user stored in a device other than the determined user device.

8. A non-transitory computer-readable recording medium having stored thereon a computer program for executing the method of claim 1.

9. A system for supporting photographing of a golf swing, the system comprising:
   a target device determination unit configured to determine a user device matched with information on a user who is to perform a golf swing, among a plurality of user devices, with reference to a scenario associated with the golf swing;
   a photographing management unit configured to cause a photographing module of the determined user device to photograph the golf swing of the user; and
   a result information management unit configured to provide information on a result of the scenario associated with the golf swing to the determined user device,
   wherein the target device determination unit is configured to determine, as the matched user device, a user device corresponding to a user who takes a turn determined on the basis of the scenario associated with the golf swing, among the plurality of user devices.

10. The system of claim 9, wherein the photographing management unit is configured to determine a start time and an end time of the photographing on the basis of information on at least one of a position and a posture of the user.

11. The system of claim 9, wherein the photographing management unit is configured to determine a start time and an end time of the photographing on the basis of information on a position of a golf ball for which the golf swing is to be performed.

* * * * *